United States Patent
Murray (10) Patent No.: US 10,005,345 B2
(45) Date of Patent: Jun. 26, 2018

(54) REMOVABLE AUTOMOBILE AWNING

(71) Applicant: David E. Murray, Byron, GA (US)

(72) Inventor: David E. Murray, Byron, GA (US)

(*) Notice: Subject to any disclaimer, the term of this patent is extended or adjusted under 35 U.S.C. 154(b) by 81 days.

(21) Appl. No.: 15/074,011

(22) Filed: Mar. 18, 2016

(65) Prior Publication Data

US 2017/0267078 A1     Sep. 21, 2017

(51) Int. Cl.
*B60J 7/11*     (2006.01)

(52) U.S. Cl.
CPC ..................... *B60J 7/11* (2013.01)

(58) Field of Classification Search
CPC .......................................................... B60J 7/11
USPC ................................ 296/102, 136.05, 136.11
See application file for complete search history.

(56) References Cited

U.S. PATENT DOCUMENTS

| | | | |
|---|---|---|---|
| 3,992,053 A | 11/1976 | Hrytzak | |
| 4,475,764 A * | 10/1984 | Hutchinson | B60J 11/00 296/136.11 |
| 4,828,319 A * | 5/1989 | Benson | B60J 11/02 160/23.1 |
| 5,110,178 A * | 5/1992 | Love | B60J 7/11 296/136.02 |
| 5,400,813 A | 3/1995 | Swan | |
| 6,352,300 B1 * | 3/2002 | Beal | B60J 7/223 296/180.1 |
| 7,354,096 B2 | 4/2008 | Hacker | |
| 2003/0141739 A1 | 7/2003 | Dong | |
| 2012/0061991 A1 * | 3/2012 | Cimatti | B60J 7/1851 296/108 |

* cited by examiner

*Primary Examiner* — Joseph D. Pape
(74) *Attorney, Agent, or Firm* — J. T. Hollin, Jr. Attorney at Law, P.C.

(57) ABSTRACT

Disclosed is an awning which is specifically designed to attach, in a horizontal orientation, above the heads of passengers in a convertible automobile. The occupants may travel with the convertible top down and enjoy a relative cooler temperature and protection from ultraviolet rays. Generally, the screen material used to comprise the awning is of a mesh design, sized and fitted to be usable for providing overhead coverage of the passenger seats on a specific convertible. Varying lengths and widths of the screen material are fabricated for different size automobiles. The awning is supported at the windshield header of the convertible and by two vertically-oriented posts behind the rearmost seats of the convertible. The awning is readily installed on the automobile and may, when not in use, be rolled up and stored within the trunk of the subject convertible.

5 Claims, 7 Drawing Sheets

REMOVABLE AUTOMOBILE AWNING

CROSS-REFERENCES TO RELATED APPLICATIONS

Not applicable

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

This inventive concept relates to a sun shield, which is a specifically constructed awning for passengers and the interior surfaces of convertible-style automobiles. The disclosed awning is designed and fabricated to provide means whereby the automobile, with the convertible top is down or stowed, is shaded from the uncomfortably warm and damaging effects of ultraviolet rays. Thus, the interior of the automobile is kept at a reasonable temperature, similar to being parked under a shade tree. The awning prevents discomfort to the vehicle occupants when the vehicle is entered, and possible damage to upholstery and expensive electronic equipment, such as radios, and GPS navigation units due to excessive heat.

The purpose of the screen is to allow occupants of a convertible to travel with the top down (stowed), while enjoying the cooler temperature provided by the screen. The screen also provides significant protection from U.V. rays. (Eighty five to ninety percent, as advertised by the screen manufacturer). The difference in internal versus external temperatures, as tested in an un-scientific way was an average of seven degrees, Fahrenheit. The entire awning assembly may be installed and/or removed in minimal time with no tools required. The awning, when removed and rolled up, is of a storable size for placement into the trunk of the convertible.

(2) Description of the Related Art, Including Information Disclosed Under 37 CFR 1.97 and 1.98.

The following are summaries of devices and/or documents which bear some relationship to the inventive disclosed herein:

U.S. Pat. No. 5,400,813 (Mar. 28, 1995) An awning which is universally adaptable to nearly all passenger vehicles, as well as recreational vehicles, is disclosed. A tarp is connected through roof tethers, either to a roof rack or vehicle gutter at one end, and is supported by support poles and tethers and anchored to the ground at the other end. The support poles are collapsible, and the tarp is made of a relatively lightweight material. The tethers are long and short and have loops and spring snap hooks or gutter clamps at opposite ends for quick attachment to the tarp and ground supports and to an automobile roof rack or gutter. The tarp, collapsed poles and tethers are self-contained within a stuff sack for easy portability.

U.S. Pat. No. 7,354,096 (Apr. 8, 2008). Disclosed is a shade producing apparatus for protecting the exterior and interior of an automobile, truck or vehicle as well as the passengers. A shade producing canopy supported by poles extending either from the rear trunk or from on top of the roof of a vehicle. The entire folding or collapsible poles and canopy are stored in a hollow airfoil-shaped spoiler. The base of the airfoil-shaped spoiler's two risers is attached to the vehicle. Two tie-down bungee cords are the only other parts that touch the surface of the vehicle. An operator may deploy and retract the shade canopy while remaining on one side of the vehicle.

U.S. Pat. No. 3,992,053 (Nov. 16, 1976). A sun shield for automobiles comprises a strip of screening material which is stored on a roller within a cylindrical container attached to the automobile. When in use, the material is drawn out of the container through a slit therein, and is pulled over the automobile and attached at its free end to the automobile so that the roof is shielded. The screening material is kept spaced from the automobile bodywork by means of legs which fold up when the sun shield is stored.

U.S. Published Patent Application #2003/0141739 (Jul. 31, 2003. The invention provides a sunshade apparatus for an automobile. An awning (12) is mounted above roof carry bars (10) of a vehicle. Within seconds of manual operation, the awing can either be retracted to occupy a relatively small area, or be fully extended to generate a large rectangular shade area, typically 7 by 8 feet directly above the automobile roof. The awning may be manually retracted or extended by a driver within seconds even when the vehicle is moving. The sunshade apparatus comprises multi-parallelogram shaped supporters (16). These supporters are extendable and retractable along the direction of vehicle width. Awning ribs (14) or awning rollers are perpendicularly mounted on the multi-parallelogram shaped supporters. The awning is mounted on ribs or rollers, so that the awning becomes extendable and retractable along the direction of vehicle width.

BRIEF SUMMARY OF THE INVENTION

The purpose of the disclosed awning is to allow occupants of a convertible automobile to travel in the automobile with the top down, while enjoying the cooler temperature provided by the screen material of the awning. The screen also provides significant protection from U.V. rays. Generally, the screen material used to comprise the awning is of a mesh design, sized and fitted to be usable for providing overhead coverage of the passenger seats on a specific convertible. Varying lengths and widths of the screen material are fabricated for different size automobiles.

The screen material is characterized by four different seams forming channels along the front, left side, right side, and rear of the screen. The left side and right side channels of the screen each house a flexible and/or stretchable cord (for example, a bungee) running interiorly to the left and right channels of the screen. The front seam of the screen interiorly contains a rigid front bar. The front bar further modified by two half-cylindrical clips: one integral to the left end of the front bar and the other clip integral to the right end of the front bar. The two clips are easily attachable to the upper windshield header of the convertible.

The rear seam of the screen houses left and right, rigid L-shaped braces, one branch of each L-shaped brace being partly inserted into the left side and into the right side of the rear seam, respectively. The opposite branches of each left and right brace are inserted into left and right guide tubes, respectively. In the preferred embodiment, attachment to the interior body structure of the convertible is provided for by left and right angle-brackets, each angle-bracket having a structural profile which corresponds to certain components of the left and right interior body structure of the convertible. Each angle-bracket contains sockets which serve to accommodate and tightly secure the lower end of each respective guide tube.

The left and right cords will be attached to the left and right ends, respectively, of the front bar. The left and right cords run lengthwise of the awning body, within the left seam and the right seam, respectively, to connect to the rear-positioned horizontal brace, thereby keeping the screen 2 taut and stretched.

DETAILED DESCRIPTION OF THE INVENTION

The objects, features, and advantages of the inventive concept presented in this application are more readily understood when referring to the accompanying drawings. The drawings, totaling eighteen figures, show the basic components and functions of the preferred embodiment and at least one alternate embodiment. In the several figures, like reference numbers are used in each figure to correspond to the same component as may be depicted in other figures.

The preferred embodiment of the disclosed inventive concept is designed, constructed, and utilized to be compatible with a 2004 Ford® Thunderbird convertible. The predominance of the drawings and descriptions set forth in this disclosure therefore are particularly adapted for use in conjunction with the 2004 Ford® Thunderbird convertible. Nonetheless, the overall concept and general relatedness and functions of the components of the awning 1 are applicable to any automobile convertible.

As can be readily understood, there are several dozen makes and models of automobile convertibles worldwide. An owner or manufacturer of a convertible may decide to utilize the inventive concept in this disclosure as a standard or optional accessory. In this event, the function and structure of the attachment points generally described in FIG. 1 as points A, B, C, D, E, and F, will be specifically modified so as to correspond to the structure of a specific automobile convertible.

Figure 1:
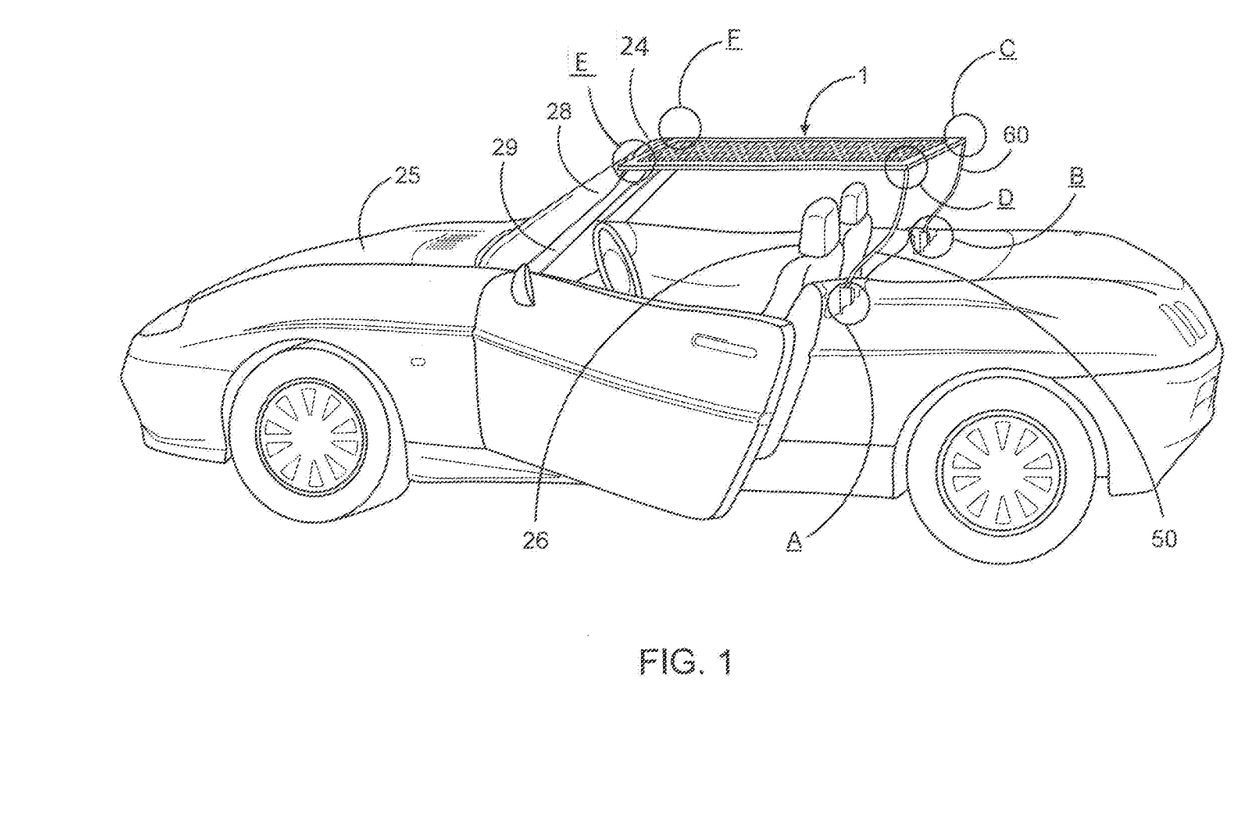
FIG. 1 is an illustration of the awning 1 as it is attached in place over a typical convertible automobile 25.

Beginning with FIG. 1, there is illustrated a stylized illustration of the awning 1. The awning 1 is shown as it would be necessarily attached at several key points in order to provide a horizontally oriented covering overhead the passenger seats 26, 27 of a typical convertible automobile 25. By virtue of the design of the components of substantially all automobile convertibles, a stowage compartment is provided aft of the passenger seats, which stowage compartment is either mechanically or electrically opened for extension and/or retraction of the convertible top. In FIG. 1, the automobile 25 convertible top has been retracted into a stowage compartment, the stowage compartment further having left and right stowage walls 90, 91 (not shown in FIG. 1) of the automobile 25.

The covering comprising the awning 1 is a screen 2, having the form of a quadrilateral. The front portion of the awning 1 is connected to the automobile 25 at the windshield 28, the windshield post 29, or the windshield header 24 by means of attachment points E and F. The left rear corner and right rear corner of the awning 1 are connected at attachment points D and C, respectively. In the preferred embodiment of this inventive concept, attachment points D and C are in turn supported by the upper end of a left guide tube 50 and the upper end of a right guide tube 60, respectively.

Figure 16:
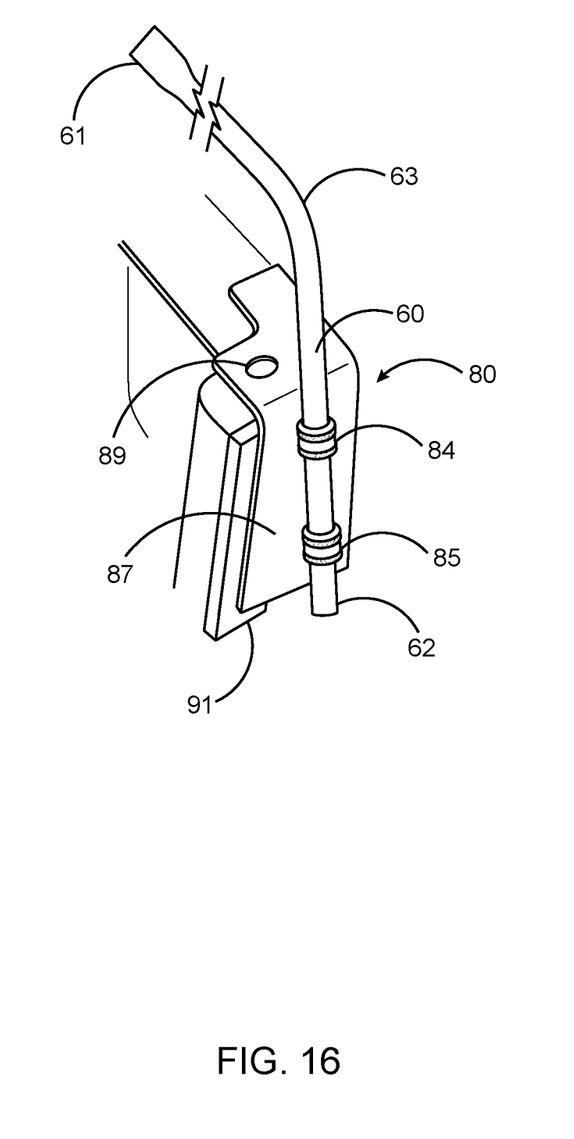
FIG. 16 is a view of the relative positions and orientation of the right angle-bracket 80 and the right guide tube 60, as mounted on the right stowage wall 91 of a convertible.

The left and right guide tubes 50, 60 are attached to the left and right stowage walls 90, 91 of the automobile 25 at attachment points A and B, respectively. A segment of the right storage wall 91 is illustrated in FIG. 16 herein. In the preferred embodiment, attachment points A and B take the form of a left angle-bracket 70 and right angle-bracket 80. The angle brackets 70, 80, are not shown in FIG. 1, due to limitations of space and overall clarity. However, the structure of an angle-bracket is illustrated in fuller detail in FIG. 10 through FIG. 14, herein, of this disclosure.

Although not clearly shown in FIG. 1, in the preferred embodiment, the rear portion of the screen 2 is connected to an internally installed horizontal brace 40, which brace 40 is exposed at attachment points C and D, respectively. The horizontal brace 40 is illustrated in more detail in FIG. 5 and FIG. 5(a).

Generally, the screen 2 composing the awning 1 is a dense, mesh design which is sized and fitted to provide overhead sheltering of the occupants of the passenger seats of a convertible. Varying lengths and widths of the screen 2 are fabricated for different size convertibles. As shown in FIG. 1, the horizontal brace 40 is inserted into a left guide tube 50 and a right guide tube 60, respectively. Both guide tubes 50, 60, are in turn, secured by means of the left angle-bracket 70, and the right angle-bracket 80, (not shown in FIG. 1) at attachment points A and B, respectively. As stated earlier, the angle-brackets 70, 80 are attached to structural components of the interior walls of the automobile 25 stowage compartment, which compartment houses the retracted convertible top.

Figure 2:
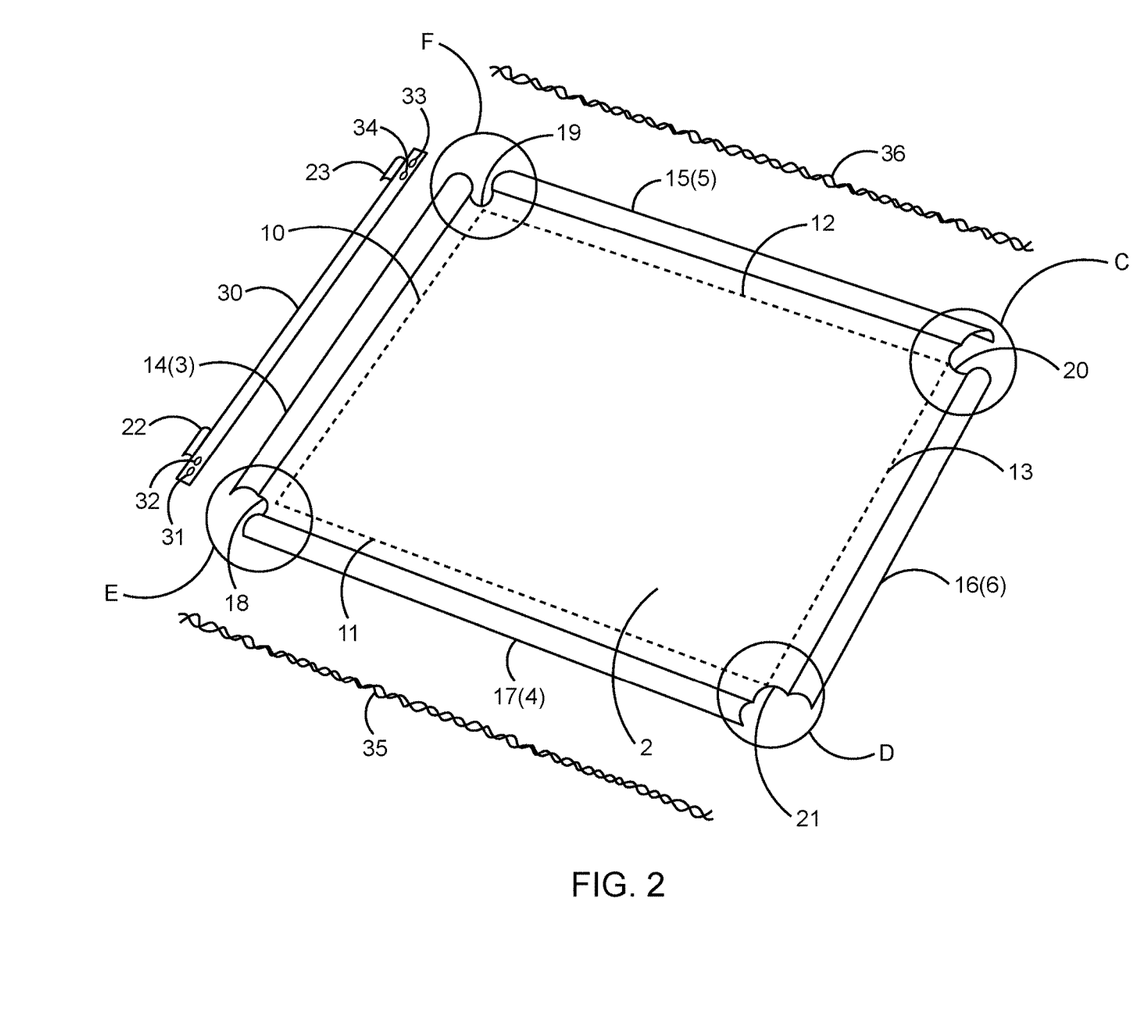
FIG. 2 shows the screen 2 by means of an exploded view, along with the front bar, four seams, and two bungee cords, all used in conjunction with the final assembly of the awning 1.

FIG. 2 shows the screen 2, which comprises the awning 1, by means of an exploded view, prior to its final fabrication. As shown in FIG. 2, the screen 2 is a quadrilateral shape having, at each corner, a circular radial cutouts at the front left 18, front right 19, right rear 20, and left rear 21. The cutouts further define strips of screen 2 material forming a front edge 14, a right edge 15, a rear edge 16, and a left edge 17 of the screen 2. The final assembly of the screen 2 requires four different seams 10, 11, 12, 13 sewn along each edge of the screen 2. The seams thus form individual channels, e.g., a front channel 3, a left channel 4, a right channel 5, and a rear channel 6.

Figure 3:
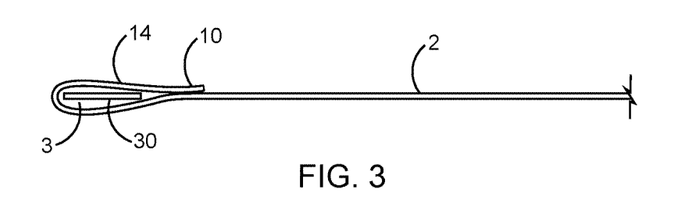
FIG. 3 is a direct left-side view of the screen 2, which in turn, shows the front seam 3 and the inserted front bar 30.

By referring to FIG. 2, it may be seen that the channels 3, 4, 5, 6 are fabricated by taking each of the edges 14, 15, 16, 17 and folding each individual edge over onto the main part of the screen 2. The next step is to stitch four seams 10 11, 12, 13, parallel to the edges of the screen 2, the stitches joining each edge 14, 15, 16 17 to the screen 2. This operation forms a front channel 3, a left channel 4, a right channel 5, and a rear channel 6. As an example, FIG. 3 illustrates a view looking lengthwise through the front channel 3, which has been formed by stitching a seam 10 to attach the front edge 14 onto the screen material 2. Likewise the left channel 4, right channel 5, and rear channel 6 are formed in the same manner of stitching seams along the respective edges 15, 16, and 17 of the screen 2.

Again referring to FIG. 2, there is shown a left bungee cord 35, and a right bungee cord 36, each cord 35, 36 having a length greater than its respective side of the screen 2. The bungee cords 35, 36 are inserted into the left channel 4, and right channel 5, respectively. A user of the awning 1 then may give more defined form and some degree of rigidity to the sides of the screen 2 by pulling both cords 35, 36 taut. This is accomplished by securing each cord 35, 36 to both the front bar 30 and the respective ends of the rear horizontal brace 40.

The front bar 30 as shown in FIG. 2, is of rectangular cross-section, and, further has a length greater than the length of the front edge 14 of the screen 2. Left and right half-cylindrical clips 22, 23, are shown attached to the front bar 30. In the final fabrication stages, the front bar 30 is inserted through the front channel 3, with openings provided for the half-cylindrical clips 22, 23. The half-cylindrical clips 22, 23 are utilized for tensioned attachment of the front bar 30 of the awning 1 to the upper header 24 of the windshield 29. FIG. 3 presents a direct left-side view of the screen 2, and also illustrates the front seam 10, the formation of the front channel 3, and the manner in which the front channel 3 encompasses the front bar 30.

As illustrated in FIG. 2, the front bar 30 further contains two holes 31, 32 drilled proximate the left end of said front bar 30, and two holes 33, 34 drilled proximate the right end of said front bar 30. When a user pulls the left and right bungee cords 35, 36 taut, the respective cords 35, 36, are then tied to the front bar 30 by utilization of the holes 31, 32, 33, 34, in the front bar 30. The left bungee cord 35, having been inserted through the left channel 4, is fastened to the front bar 30 by tying the front of the cord 35 into the left holes 31, 32. The right bungee cord 36, having been inserted through the right channel 5, is fastened to the front bar 30 by tying the front of the cord 36 into the right-side holes 33, 34.

Figure 4:
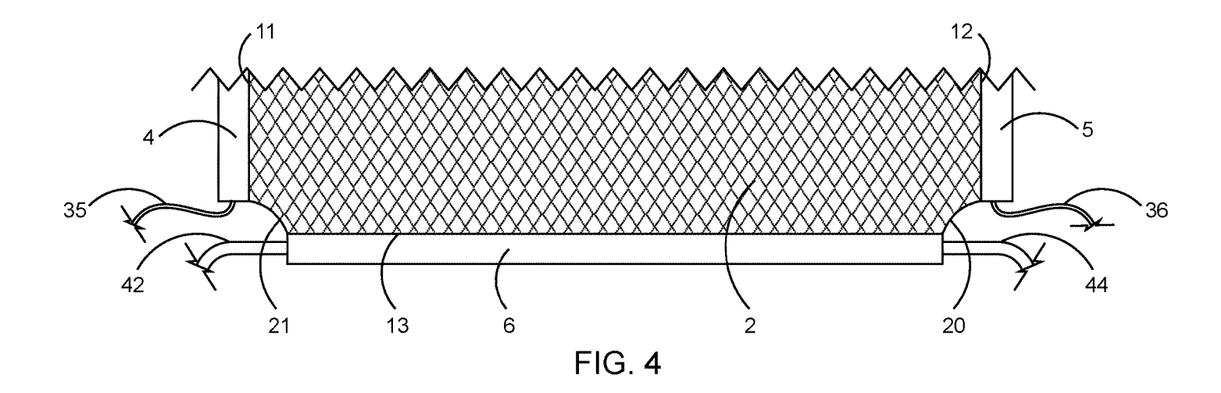
FIG. 4 is a top view of the rear portion of the screen 2, further showing the rear seam 13, the ends of the horizontal brace 42, 44, and the left and right cables 35, 36.

In referring to FIG. 4, it is seen that the rear seam 13 of the screen 2 forms the rear channel 6, which interiorly contains the horizontal rear brace 40. The brace 40 allows the rear portion of the screen 2 to maintain a relatively taut profile from left-to-right, and thereby gives more rigidity to the entire awning 1. FIG. 4 presents a top view of the rear portion of the screen 2, further showing the rear channel 6, the left end 42 and the right end 44 of the horizontal brace 40. FIG. 4 also shows the left cord 35 and the right cord 36 as each is transmitted through the left channel 4 and the right channel 5, respectively of the screen 2. To ensure tautness of the awning 1, a user securely fastens the left cord 35 about the exposed left rounded end 42 of the horizontal brace 40, and similarly securely fastens the right cord 36 about the exposed right rounded end 44 of the horizontal brace 40.

Figure 5:
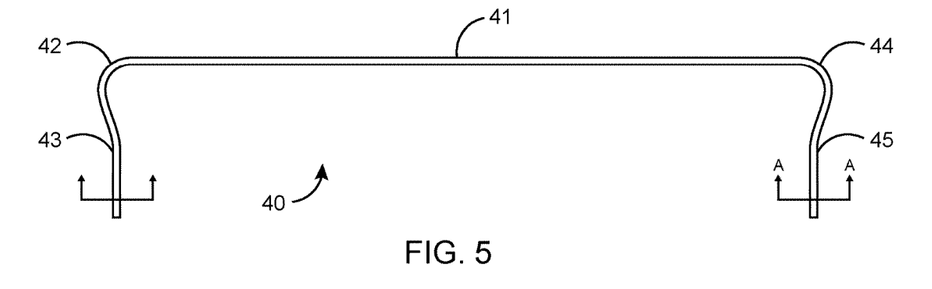
FIG. 5 presents a frontward-looking view of the profile of the horizontal brace 40.
Figure 5A:
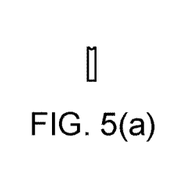
FIG. 5(a) is sectional view of the horizontal brace 40 as seen from the perspective of section line A-A.

FIG. 5 presents a standalone, frontward-looking view of the horizontal brace 40, further depicting the straight spine 41 of the horizontal brace 40, left rounded end 42, the left leg 43, the right rounded end 44, and the right leg 45. FIG. 5(a) shows a sectional view typical of the entirety of the horizontal brace 40 and spine 41, as seen from the perspective of section lines A-A of FIG. 5. The left leg 43 and the right leg 45 are specifically dimensioned to fit within the confines of guide tubes 50, 60, an illustration of each guide tube 50, 60 presented in FIG. 9.

Figures 6, 7, 8:
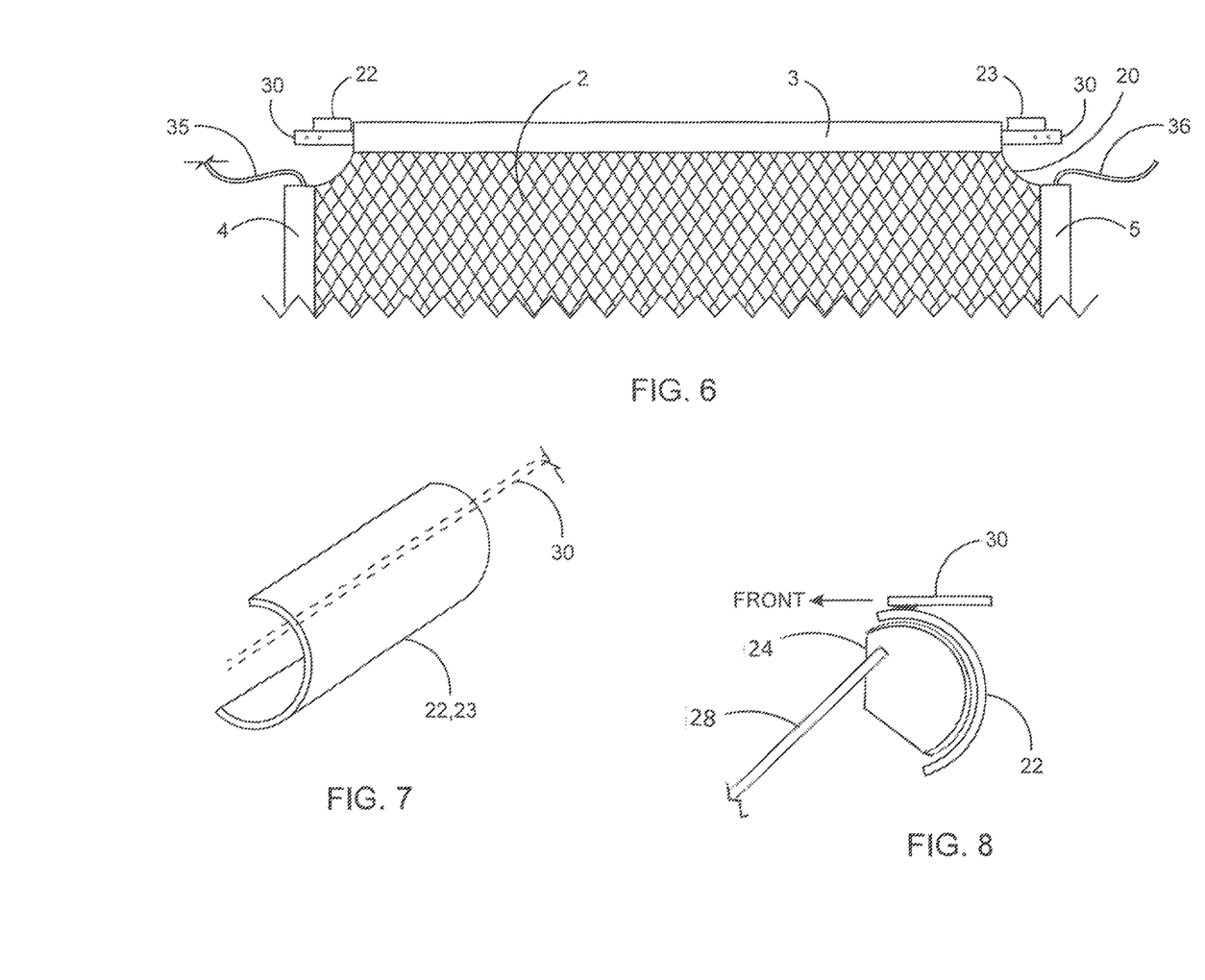
FIG. 6 presents a top view of the frontward portion of the screen 2, further showing the front seam 10, front bar 30, two half-cylindrical clips 22, 23, and the left and right cables 35, 36.
FIG. 7 is a rendering, typical of each of the two half-cylindrical clips, both of which are integral to the front bar 30.
FIG. 8 is a side view depicting the attachment of the left clip 22 to the left end of the front bar 30, and concurrently, attachment to the windshield header 24.

FIG. 6 shows a top view of the frontward portion of the screen 2, further showing the front channel 3, front bar 30, two half-cylindrical clips 22, 23, and the left and right cables 35, 36. Also shown in FIG. 6 are the left channel 4 and right channel 5, through which the left cable 35 and right cable 36, respectively are routed. On installation of the screen 2, the front end of the left cable 35 is fastened through an outer hole 31 and an inner hole 32, both holes having been drilled through the left end of the front bar 30. The front end of the right cable 36 is fastened through an outer hole 33 and an inner hole 34, both holes having been drilled through the right end of the front bar 30.

FIG. 7 is an illustration typical of either of the two half-cylindrical clips 22, 23, each of which is constructed integral to one end of the front bar 30. FIG. 8 presents a left-side view common to each of the half-cylindrical clips 22, 23, and further showing the positioning of each half-cylindrical clip 22, 23 relative to the front bar 30.

Figure 9:
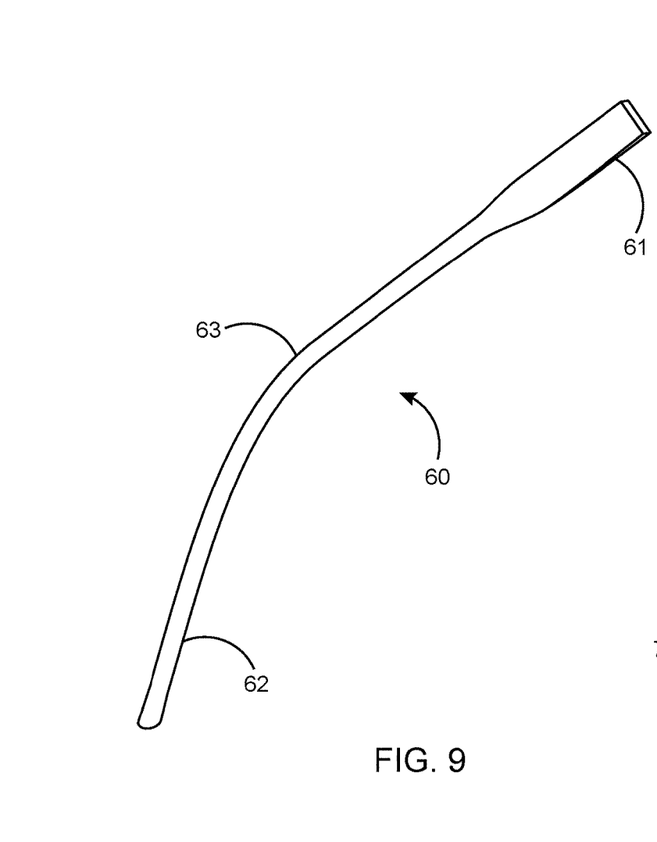
FIG. 9 is a perspective rendering of the right guide tube 60.

FIG. 9 is a rendering of a right guide tube 60, the left guide tube 50 being identical in shape, form and dimensions. Both guide tubes 50, 60 have hollow interiors. As can be observed in FIG. 9, the right guide tube 60 is characterized by an arcuate bend 63. A right rectangular branch 61 of the guide tube 60, manifests a rectangular opening, while a right tubular branch 62 of the right guide tube 60 manifests a circular-shaped opening. The right rectangular branch 61 of the right guide tube 60 is specifically dimensioned to accept the insertion of the right leg 45 of the rear brace 40. The left rectangular branch 51 of the right guide tube 50 is specifically dimensioned to accept the insertion of the left leg 43 of the rear brace 40.

The circular-shaped openings 52, 62, of the left and right guide tubes 50, 60, respectively are dimensioned to be fitted into the left angle-bracket 70 and a right angle-bracket 80, respectively. For purposes of illustration only, and not by means of limitation, angle-brackets specifically constructed for secure fit onto the interior walls of a 2004 Ford®

Thunderbird convertible are shown in FIG. 10 through FIG. 14. It must be made clear that the design of the angle-brackets may be markedly different to correspond to the interior surfaces and contours of other makes of automobile convertibles.

Figure 10:
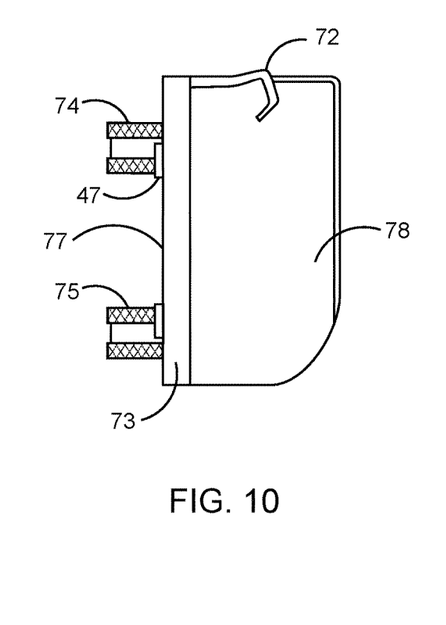
FIG. 10 is a view of the inner surface of the inner plate 78 of the left angle-bracket 70.

In FIG. 10 there is shown the left angle-bracket 70, and specifically the front plate 77, inner plate 78, left flange 73, and left hook 72, all these components being necessary to provide a conforming fit onto the inner surfaces and contour of the left stowage wall 90 (not shown) of a 2004 Ford® Thunderbird convertible. In FIG. 10, there is also shown an upper clamp 74 and a lower clamp 75, both of which are identical, and which are affixed to the left angle-bracket 70. Each of the respective clamps 74, 75, has an open circular interior for acceptance the left tubular branch 61 of the left guide tube 60. The inner plate 78, the left flange 73, the left upper plate 71, and the left hook 72 of the left angle bracket 70 are specifically constructed to fit onto the appropriate surface of the left stowage wall 90 (not shown) of the preferred embodiment.

For comparative and illustrative purposes, in FIG. 16, a right angle-bracket 80 is shown as it is fitted onto the right stowage wall 91 of the preferred embodiment. The right angle-bracket 80 the mirror image of the left angle-bracket 70, and both are utilized for attachment to the right stowage wall 91 and left stowage wall 90 of the 2004 Ford® Thunderbird convertible, respectively. Both angle-brackets 70, 80, are specifically designed for corresponding acceptance of the left and right guide tubes 50, 60, respectively.

Figure 11:
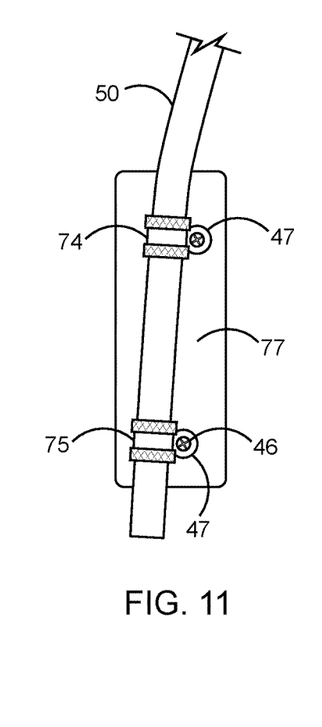
FIG. 11 shows a view of the front plate 77 of the left angle-bracket, including the upper clamp 74, the lower clamp 75, and an inserted left guide tube 50.

Continuing with the structure of the left angle-bracket 70, there is shown in FIG. 11 a direct view of the front plate 77 of the left angle-bracket 70, including the upper clamp 74, the lower clamp 75, and an inserted left guide tube 50. The clamps 74, 75, are affixed to the front plate 77 by means of a machine screw 46 inserted through an eyelet 47 and threadingly attached to the surface of the front plate 77.

Figures 12, 13, 14, 15, 15A:
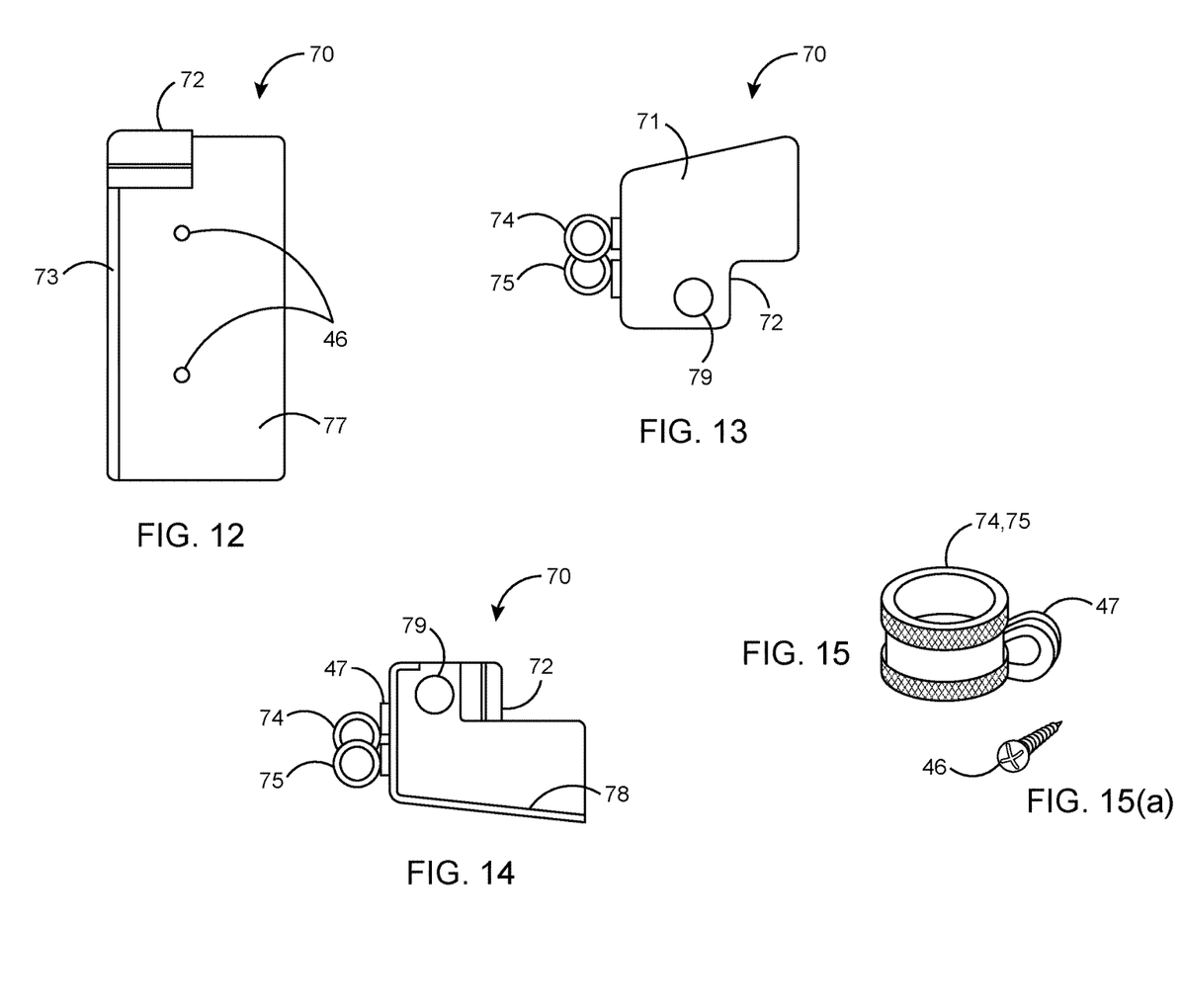
FIG. 12 is a view of the inner surface of the front plate 77 and the edge of the flange 73 of the left angle-bracket 70.
FIG. 13 is a top view, looking directly downward at the upper plate 71 of the left angle-bracket 70.
FIG. 14 presents a bottom view looking upward, directly along the inner surface of the inner plate 78 of the left angle-bracket 70.
FIG. 15 illustrates a view of either the upper or lower clamp 74, 75 which attaches to the front plate 77 of the left angle-bracket 70.
FIG. 15(a) depicts the machine screw used to fasten clamps 74, 75, to the angle-brackets 70, 80.

FIG. 12 is a side view of the inner surface of the front plate 77 and the edge of the flange 73 of the left angle-bracket 70. Further shown are the hook 72 and the tips of the two machine screws 46 used for attachment of the upper and lower clamps 74, 75.

FIG. 13 is a top view, looking directly downward at the upper plate 71 of the left angle-bracket 70, along with a top view of the hook 72, and the upper and lower clamps 74, 75. An aperture 79 in the upper plate 71 is positioned to allow clearance for a snap integral to the compartment wall of the preferred embodiment, the snap intended for attachment of a convertible tonneau.

FIG. 14 presents a bottom view of the left angle-bracket 70 looking upward, directly along the inner surface of the inner plate 78 of the left angle-bracket 70. Further shown in FIG. 14 is the left aperture 79, the left hook 72, and the upper and lower clamps 74, 75.

FIG. 15 illustrates a view typical of either the upper or lower clamp 74, 75, both of which attach to the front plate 77 of the left angle-bracket 70.

FIG. 15(a) depicts the machine screw used to fasten the upper and lower clamps 74, 75, to the angle-brackets 70, 80.

As explained previously, FIG. 16 is a view of the relative positions and orientation of the right angle-bracket 80 and the right guide tube 60, as mounted on the right stowage wall 91 of the preferred embodiment.

While the preferred embodiment of the present inventive concept has been extensively shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept.

Such variations, changes, and substitutions may involve the design and construction of similar features which are necessary to operate the inventive device on other versions of automobile convertibles. These variations, changes, and substitutions obviously may be used instead of, in combination with, or in addition to features already disclosed herein. Accordingly, it is intended that this inventive concept be inclusive of such variations, changes, and substitutions, and by no means limited by the literal scope of the claims presented herein.

What is claimed is:

1. A removable collapsible awning for manual, horizontal attachment to portions of a walled stowage compartment of a convertible automobile having a convertible top on occasions when the convertible top is stowed in the walled stowage compartment, comprising:

a screen of dense material cut into a generally rectangular shape and further having a front end, a right side, a rear end, and a left side;

a left angle bracket having a means of attachment to at least one section of the stowage compartment of the automobile;

a right angle-bracket having a means of attachment to at least one section of the stowage compartment of the automobile;

a left guide tube of a specific length, having at one end, a means of attachment to the left side of the screen and having at the opposite end, a means of attachment to the left-angle bracket;

a right guide tube of a specific length, having at one end, a means of attachment to the right side of the screen and having at its opposite end, a means of attachment to the right angle-bracket; and a means of secure attachment of the front end of the screen to either the windshield, the windshield header, or windshield posts of the convertible automobile, wherein the entirety of the screen, the left and right angle brackets, and the tubes are assembled in a coordinated manner so as to support the screen in a horizontal, planar orientation directly above the passenger seats of the convertible automobile.

2. A removable, collapsible sun shielding device for attaching to portions of a walled stowage compartment of a convertible automobile having a convertible top on occasions when the convertible top is stowed in the walled stowage compartment, the device comprising:

a rectangular-shaped, dense screen material having a front channel, a left channel, a rear channel, and a right channel, wherein each said channel comprises a lengthwise opening formed by a parallel folding of a portion of the screen at each side of the rectangle over onto the main part of the rectangle and a stitched lengthwise seam to form said opening;

a rigid rectangular-shaped front bar comprising outer dimensions corresponding to the length and opening of the front channel, said front bar further having two holes drilled proximate the first end of said front bar, and two holes drilled proximate the second end of said front bar, further, said front bar being inserted interiorly to a front channel;

a semi-cylindrical left clip attached parallel to, and proximate a left end of the front bar with the convex surface facing toward the front bar, and a semi-cylindrical right clip attached parallel to, and proximate the right end of the front bar, with the convex surface of said right clip facing toward the front bar;

a rigid horizontal brace having a primarily rectangular cross-sectional profile and having a length exceeding the length of the rear channel, and further, each end of said brace being orthogonally bent downward;

a left guide tube having a first end shaped as a tubular cross-section and a second end shaped as a hollow rectangular cross-section, said rectangular cross section having internal dimensions corresponding to an outer cross section surface of the horizontal brace;

a right guide tube having a first end shaped as a tubular cross-section and a second end shaped as a hollow rectangular cross-section, said rectangular cross-section having internal dimensions corresponding to the outer cross-section surface of the horizontal brace;

a left angle-bracket having an upper circular socket and a lower circular socket, both sockets co-axially attached to the same outer surface of said angle-bracket, each socket further having an inner diameter corresponding to the outer tubular cross-section of the left guide tube;

a right angle-bracket having an upper circular socket and a lower circular socket, both sockets of the right angle-bracket co-axially attached to the same outer surface of said right angle-bracket, each socket further having an inner diameter corresponding to the outer tubular cross-section of the right guide tube; and a left cord having a length exceeding the length of the left channel and a right cord having a length exceeding the length of the right channel.

3. A sun shielding device as in claim 2, wherein the rectangular-shaped front bar comprises outer dimensions approximately corresponding to the length and opening of the front channel, and wherein the two holes proximate the first end of the front bar comprise an outer through-hole and an inner through-hole, each drilled 0.5 inch and 1.5 inch, respectively, from the first end of said front bar, and wherein the two holes drilled proximate the second end of the front bar comprise an outer through-hole and an inner through-hole, each drilled 0.5 inch and 1.5 inch, respectively, from the second end of said front bar.

4. A sun shielding device as in claim 2, specifically designed and dimensioned to correspond to the planar area directly above the heads of seated passengers in a 2004 model Ford® Thunderbird convertible, wherein the front bar, the left and right semi-cylindrical clips, the horizontal brace, the left and right guide tubes, and the left and right angle brackets are customized and fitted to correspond to the windshield and interior convertible top stowage walls, respectively, of said convertible.

5. A method for providing shielding from solar rays when occupying an interior of a convertible-style automobile equipped with a convertible and a walled convertible top stowage compartment, with the convertible top retracted, comprising the steps of:

providing a dense, rectangular section of screen material having a front side, a rear side, a left side, and a right side, further having dimensions approximating the length and width of the overhead horizontal area projected above the passenger seats of said automobile; and attaching the front side of said screen material to an upper frame of the windshield of said automobile and attaching the rear side of said screen material to vertical post supports which posts are affixed to the left and right sides of the stowage compartment of said convertible automobile.

* * * * *